UNITED STATES PATENT OFFICE.

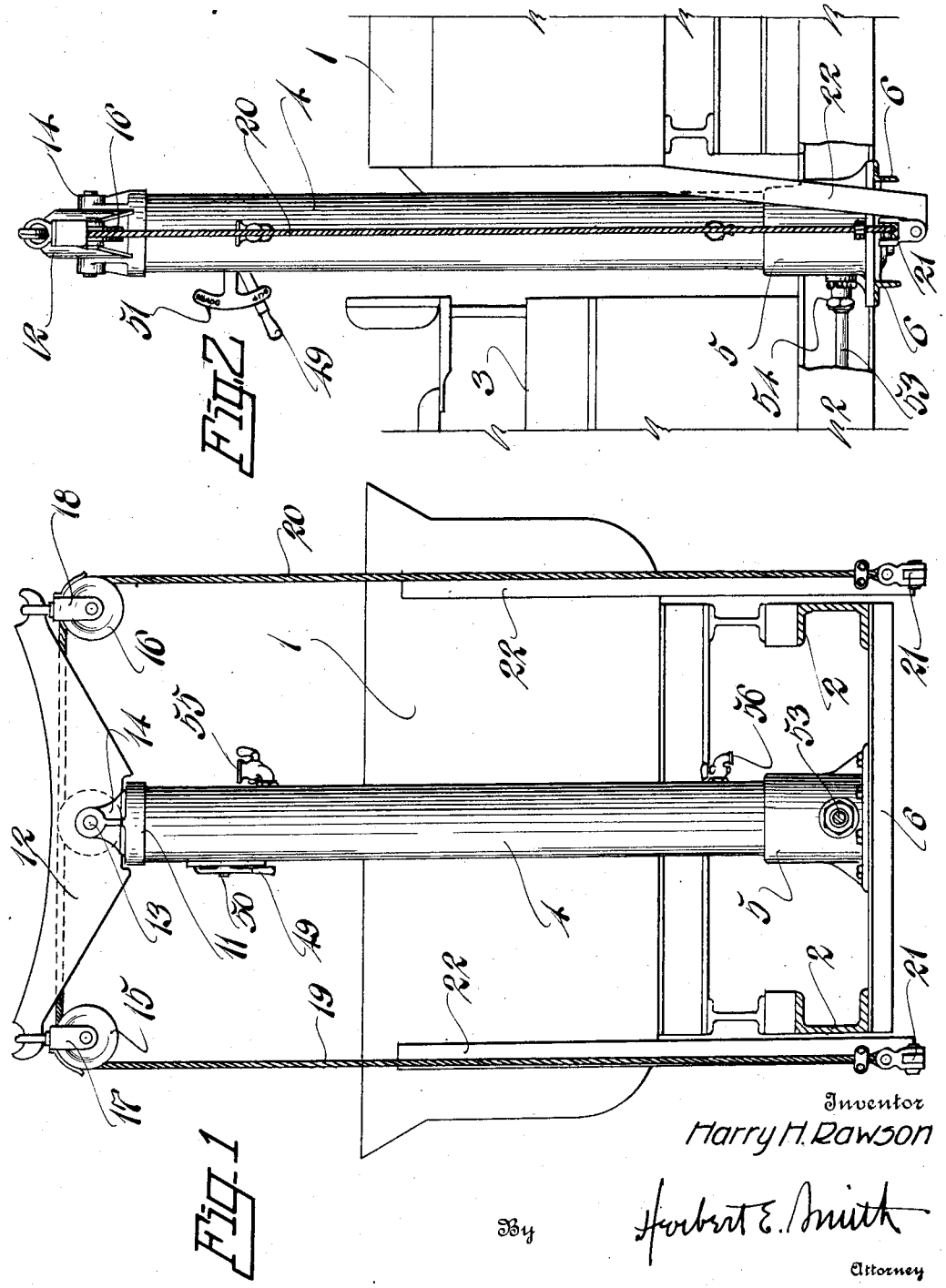

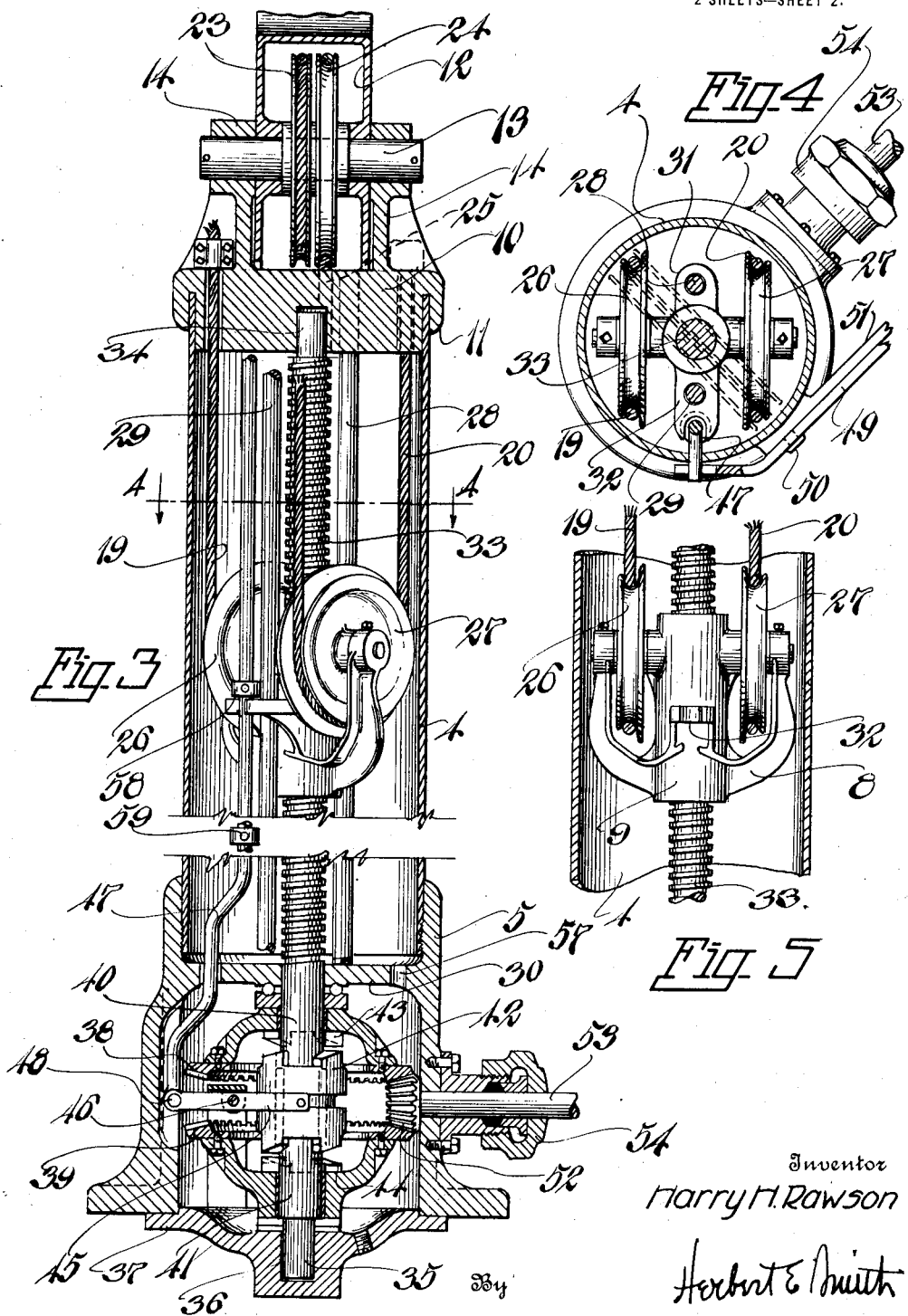

HARRY H. RAWSON, OF SPOKANE, WASHINGTON.

BODY-HOIST.

1,388,372.   Specification of Letters Patent.   Patented Aug. 23, 1921.

Application filed March 1, 1920. Serial No. 362,522.

*To all whom it may concern:*

Be it known that I, HARRY H. RAWSON, a citizen of the United States, residing at Spokane, in Spokane county and State of Washington, have invented certain new and useful Improvements in Body-Hoists, of which the following is a specification.

The present invention relates to improvements in body hoists for automobile trucks and similar vehicles, and is designed for the purpose of elevating the hinged or pivoted body of the vehicle preparatory to dumping the contents of the body, and for lowering the elevated body to normal position after the dumping operation.

The primary object of the invention is the provision of a hoisting apparatus for positively manipulating the pivoted dumping body with facility and despatch and the invention involves mechanism located between the forward or upwardly movable end of the body and the driver's seat in order that the mechanism may readily be accessible for the driver, and the invention further consists in certain novel combinations and arrangements of parts whereby the hoisting mechanism is automatically reversed and returned to normal position in the event of excessive movement of the operating mechanism.

With these objects in view I have illustrated in the accompanying drawings one complete example of the physical embodiment of my invention in which the parts are combined and arranged according to the best mode I have so far devised for the practical application of the principles of my invention, and while the disclosure is that of a complete operative mechanism, it will be understood that colorable changes and alterations are contemplated within the scope of my claim without departing from the spirit of my invention.

Figure 1 is a front end elevation of the vehicle body and its support, showing also the lifting device for the pivoted body.

Fig. 2 is a side view of the apparatus of Fig. 1 showing the driver's seat in front of the appliance of the invention, and a portion of the body of the vehicle.

Fig. 3 is an enlarged, detail sectional view of the elevating mechanism of the hoist, part being broken away for convenience of illustration.

Fig. 4 is a transverse, detail sectional view at line 4—4 of Fig. 3.

Fig. 5 is a detail view of the traveling head and its connections.

In the preferred form of the invention as illustrated in the drawings I have utilized a power driven, or automobile truck, upon which the body or receptacle 1 is pivoted or hinged in any suitable manner at the rear end of the truck, the body being shown as of standard metallic construction, and of proper shape for the purpose.

The longitudinal bolsters 2, 2, of channel beams are fixed to the truck and support the body in usual manner, and form part of the truck frame, upon which the driver's seat 3 is erected at or near the front of the truck.

The body hoist is preferably located between the driver's seat and the movable end of the dumping body of the vehicle, back of the seat and in front of the body, in order that the mechanism may be controlled and regulated with facility by the driver while he remains seated. The appliance includes a tubular standard or hollow post 4, cylindrical in cross section and of metallic construction and of the required dimensions to adapt it for the effective performance of its functions. The tubular standard is supported from a hollow base 5, located on the central longitudinal axis of the truck, and firmly fixed, as by bolts to one or more transverse beams 6 forming part of the fixed frame of the truck and held in rigid position.

Within the hollow standard is provided a vertically reciprocable or traveling, non-rotatable forked head 8, and the base or hub 9 of the head is interiorly threaded to form a non-rotatable, traveling nut within the pedestal.

The upper end of the pedestal or standard is closed by a cylindrical head block or cap 10, whose annular flange 11 fits over the top edge of the cylindrical tubular standard, as best seen in Fig. 3, and supports the cross arm 12. The cross arm extends diametrically across the top of the pedestal and is preferably formed as a hollow housing of suitable metal and immovably supported on the block and on the axle 13 which passes through the arm, the axle being supported on bearing blocks 14 cast integral with, or fixed on the head block to support the axle in horizontal position, on the block.

The cross arm, which extends diametrically of the standard is located transversely of the truck or vehicle, and carries at its extremities a pair of complementary sheaves 15 and 16 supported from the arm by the hangers 17 and 18, in which the sheaves are housed and journaled in usual manner.

Over the sheaves a cable is passed, one for each sheave, as 19 and 20, the lower ends of the cables being anchored at the sides of the truck at 21 to a pair of vertical arms 22, preferably of angle iron bars, attached at the front of the body 1 and depending a suitable distance below the body in order to provide for adequate movement of the cables as they are operated. The other ends of the cables are attached at opposite points on the underside of the head block, within the hollow standard, and the cables after passing over the sheaves 15 and 16, extending inwardly toward the center of the arm from opposite points, pass over the pair of loose sheaves 23 and 24 journaled on the axle 13 at the top of the standard. From opposite sides of the sheaves 23 and 24 the cables pass downwardly through guide apertures 25 extending vertically through the head block 10 and thence under the pulleys 26 and 27 journaled in the upper end of the forked head 8, and thence the cables extend to their anchorage at the lower side of the head block 10. The lowering of the traveling head and the pulleys carried thereby, it will be apparent, results in raising the long body-lifting ends of the cables, and the rotation of the pulleys, the sheaves on the arm and the grooved wheels on the head block, reduces the frictional contact of these parts with a consequent reduction in the power exerted, and effective application of power.

In its vertically reciprocable movement the head is guided by a pair of fixed upright rods 28, 29, diametrically disposed in the standard and secured at their upper ends in the head block 10, while at their lower ends these rods are suitably fixed in the transverse partition or head plate 30 of the base 5 of the pedestal. The head 8 is fashioned with a pair of integral, oppositely disposed and alined, perforated guide lugs 31, 32, slidable on the guide rods and by means of which the head is held in non-rotatable position and guided in its travels.

The non-rotatable head is reciprocated and actuated by the positive and direct action of a screw bar 33 projecting up into the standard and journaled at 34 in the center of the head block 10 of the standard, and rotatably supported on its lower journaled end 35 in the socket 36 of the base plate 37 of the base 5, which is secured in suitable manner to the pedestal base. It is thus apparent that the screw is designed to lower or elevate the head 8 through the instrumentality of threaded engagement of the bar with the complementarily threaded traveling, but non-rotatable hub or nut portion 9 of the head.

For the purpose of moving the head in opposite directions a differential mechanism is provided, which consists of the pair of spaced gears 38 and 39, normally loose on the journal portions or hubs 40 41 provided therefor on the screw bar, and between these gears is located the shiftable or slidable double clutch member in the form of a toothed sleeve 42. Within the cupped differential gears 38 and 39 are provided integral teeth or clutch members 43 and 44 complementary to the adjoining teeth on the clutch member 42, and the latter is adapted to engage either of the selected clutch gears to revolve with the screw bar, leaving the other gear free on the journal portion of the bar. Thus the clutch sleeve 42 may be shifted by the action of the yoke 45 on the pivot shaft 46 supported in the hollow base between the two gears 38 and 39, when the yoke is swung on its pivot by a connecting rod 47 operatively attached at 48 to the yoke to rock the latter. The connecting rod 47 is located within the standard and extends upwardly therein, and has a pivot connection extending through the wall of the standard to an operating lever 49 arranged in an approximately horizontal position adjacent the standard, and pivoted at 50 on the bracket 51 (Fig. 4) fixed to the exterior of the standard, the handle of the lever being positioned for ready access by the driver when operating the hoist.

When utilized in connection with a motor truck or automobile the screw bar is revolved by power secured from the motor or engine and transmitted to the differential pinion 52 which engages at all times with both of the gears 38 and 39 on the screw bar as described, and the pinion is carried by a shaft 53 that enters the standard base through a stuffing box 54 for the purpose.

In Fig. 3 the differential gearing is in neutral position. To operate the hoist the shaft 53 is revolved by connecting suitable clutch mechanism (not shown) from the motor to transmit motion by way of shaft 53 and pinion 52 to the gears 38 and 39. The lever 49 is now swung on its pivot, and through its connections, the clutch sleeve 42 is shifted upwardly to engage the clutch teeth 43 of the gear 38, and inasmuch as the clutch member 42 is revolved with the screw bar, the engagement of the clutch member 42 with 43 revolves the bar. The revolving movement of the screw bar causes the non-rotatable head to travel downwardly carrying with it the pulleys 26 and 27, and as one end of each of the cables is anchored to the head block, this action pulls the outer ends of the cables, thus elevating the front end of the body of the vehicle and dumping the material therefrom. After unloading, a reverse movement of the lever 49 shifts the clutch member 42 to disengage it from the upper gear and engage it with the lower gear, and the continued movement of the pinion is now transferred to the lower gear, which action causes an elevation of the head, and consequently permits the body of the vehicle to gradually lower to its normal position.

For the purpose of lubricating the working parts of the mechanism, oil is introduced through the oil cup 55, tapped in the standard at a suitable height, and a drain cock 56 is also provided in the wall of the standard, for use when needed. The oil passes down into the base of the standard, which forms the housing for the differential gearing and journal bearings, through aperture 57 in the partition of base plate 30 of the standard base, and thus affords a bath for the operating parts of the appliance.

To automatically control the differential gearing and prevent excess movement of the screw bar and head, I provide a pair of fixed and adjustable collars 58 and 59, suitably spaced on the connecting or clutch rod 47, located respectively below and above the lug 32 of the head 8, which lug forms a tappet to coact with these two collars or abutments. Thus should the head inadvertently be lowered sufficiently to cause contact of the tappet 32 with set collar 58 on the clutch rod, this contact will cause automatic shifting of the connecting rod and consequent shifting of the clutch sleeve 42 to the neutral position in Fig. 3. A similar excess of movement of the head, upwardly, will cause engagement of the tappet with set collar 59 and will cause an automatic shifting of the clutch sleeve 42 downwardly to normal position, thus rendering the mechanism inoperative.

Claim:

In an appliance as described, the combination of a truck frame and pivoted body, a fixed hollow standard, a reciprocable, non-rotatable head having pulleys in said standard, a head block on the standard, a radially arranged cross arm on said block and central and end sheaves on said arm, cables passed over said sheaves and under said pulleys and connecting the body with said block, mechanism for reciprocating said head, a control lever and connecting rod for said mechanism, spaced abutments on said rod and a tappet on the head between said abutments for automatically moving said rod to control the mechanism.

In testimony whereof I affix my signature.

HARRY H. RAWSON.